US011563653B2

(12) United States Patent
Tiwari et al.

(10) Patent No.: US 11,563,653 B2
(45) Date of Patent: Jan. 24, 2023

(54) MICROSERVICES FOR ASSESSING CLIENT EXPERIENCE IN INCIDENT MANAGEMENT

(71) Applicant: SAP SE, Walldorf (DE)

(72) Inventors: Rahul Tiwari, Bengaluru (IN); Devashish Biswas, Haridwar (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/315,075

(22) Filed: May 7, 2021

(65) Prior Publication Data
US 2022/0360505 A1 Nov. 10, 2022

(51) Int. Cl.
H04L 41/5067 (2022.01)
H04L 41/507 (2022.01)
H04L 41/5009 (2022.01)
H04L 41/5074 (2022.01)

(52) U.S. Cl.
CPC ........ *H04L 41/5067* (2013.01); *H04L 41/507* (2013.01); *H04L 41/5009* (2013.01); *H04L 41/5074* (2013.01)

(58) Field of Classification Search
None
See application file for complete search history.

(56) References Cited

U.S. PATENT DOCUMENTS

| | | | | |
|---|---|---|---|---|
| 8,700,569 B1* | 4/2014 | Wilson | ................. | G06F 16/214 707/626 |
| 11,295,250 B2* | 4/2022 | Banik | ................... | G06Q 10/20 |
| 2013/0132060 A1* | 5/2013 | Badhe | ................... | G06F 16/355 703/22 |
| 2014/0081691 A1* | 3/2014 | Wendell | ............. | G06Q 10/0633 705/7.15 |
| 2019/0164170 A1* | 5/2019 | Kataria | ................ | G06Q 10/105 |
| 2020/0272793 A1* | 8/2020 | Gorny | ................... | G06Q 50/00 |
| 2021/0173745 A1* | 6/2021 | Zoch | ..................... | G06F 9/4887 |
| 2021/0191802 A1* | 6/2021 | Hunter | ............... | G06F 11/0793 |

OTHER PUBLICATIONS

"Application Routes and Destinations," SAP Help Portal, https://help.sap.com/viewer/65de2977205c403bbc107264b8eccf4b/Cloud/en-US/3cc788ebc00e40a091505c6b3fa485e7.html, printed Apr. 2, 2021, 7 pages.

(Continued)

Primary Examiner — John A Follansbee
Assistant Examiner — Raqiul A Choudhury
(74) Attorney, Agent, or Firm — Klarquist Sparkman, LLP

(57) ABSTRACT

A technology for assessing client experience in incident management can be implemented. The technology can fetch an event log entry from a first database comprising a plurality of event log entries generated by a client, wherein the event log entry is associated with a timestamp, an event descriptor, and a prescribed target time to close the event log entry. The technology can extract a communication message sent by the client from the event descriptor, determine a polarity score based on sentiment analysis of the communication message, determine a client experience index (CEI) based on the polarity score, save the CEI in an event record in a second database, determine an aggregated CEI based on an average of a plurality of CEIs determined for the corresponding plurality of event log entries, and output the aggregated CEI.

16 Claims, 14 Drawing Sheets

(56) References Cited

OTHER PUBLICATIONS

"Cron," Wikipedia, https://en.wikipedia.org/wiki/Cron, printed Feb. 12, 2021, 10 pages.

Renu Khandelwal, "Sentiment Analysis using Embeddings," DataDrivenInvestor, https://medium.datadriveninvestor.com/sentiment-analysis-using-embeddings-f3dd99aeaade, printed Mar. 29, 2021, 18 pages.

Manikandan Elumalai, "BusinessObjects Query builder—Basics," SAP Blogs, https://blogs.sap.com/2013/06/17/businessobjects-query-builder-basics/, Jun. 17, 2013, 7 pages.

"The Fundamentals of Designing Stories in SAP Analytics Cloud," SAP HANA Journey, https://saphanajourney.com/sap-analytics-cloud/learning-article/the-fundamentals-of-designing-stories-in-sap-analytics-cloud/, printed Mar. 30, 2021, 14 pages.

Deho et al., "Sentiment Analysis with Word Embedding," 2018 IEEE 7th International Conference on Adaptive Science & Technology (ICAST), https://ieeexplore.ieee.org/document/8506717, Mar. 2019, 5 pages.

"Pattern: API Gateway/Backends for Frontends," https://microservices.io/patterns/apigateway.html, Microservice Architecture (/index.html), API gateway pattern, printed Feb. 19, 2021, 6 pages.

"Sentiment analysis," Wikipedia, https://en.wikipedia.org/wiki/Sentiment_analysis, printed Feb. 19, 2021, 16 pages.

"Sentiment: Polarity Score (Sentiment Analysis)," sentiment: Polarity Score (Sentiment Analysis) in sentiment: Calculate Text Polarity Sentiment, https://rdrr.io/cran/sentimentr/man/sentiment.html, printed Feb. 19, 2021, 10 pages.

"Visualize Sentiments in A Word Cloud—Free Tools & Tutorial," https://monkeylearn.com/blog/word-cloud-sentiment-analysis/, printed Apr. 6, 2021, 14 pages.

"What is a Microservices Architecture?", TIBCO Software, Feb. 15, 2021, 9 pages.

\* cited by examiner

| Incident ID | Last-modified timestamp | CEI | MPT |
|---|---|---|---|
| 15672 | 10:00am, 5th July 2020 | 0.50 | 10:00am, 15th July 2020 |
| 645912 | 7:10am, 15th Aug 2020 | -0.12 | 7:10am, 25th Aug 2020 |
| ... | ... | ... | ... |

410

412

| Incident ID | Last-modified timestamp | Incident Descriptor | Priority | MPT |
|---|---|---|---|---|
| 15672 | 10:00am, 5th July 2020 | Lumira server is not responding due to memory leak | Very high | 10:00am, 15th July 2020 |
| 645912 | 7:10am, 15th Aug 2020 | Date filter not working in DD/MM/YYYY format when rank is applied | Medium | 7:10am, 25th Aug 2020 |
| ... | ... | ... | ... | ... |

| Message Type | Message Lines | User Description | User ID | Message Timestamp |
|---|---|---|---|---|
| Internal memo | Hi, SAP colleague . . . | Dev Team | I058963 | 30.03.2021 06:33:31 |
| Info to customer | Dear Customer, Your incident has reached SAP Development Support team. . . . | Dev Team | I058963 | 30.03.2021 06:31:01 |
| Info to SAP | Hi Dev Team . . . | Customer ABC | Cust51312 | |
| Info to customer | Dear Customer . . . | Dev Team | I058963 | 30.03.2021 06:19:43 |
| Reply | Dear Customer . . . | Support Team | i00710 | 29.03.2021 11:19:14 |
| Info to customer | Hello, This incident is transferred to development for further analysis . . . | Support Team | i00710 | 26.03.2021 22:57:49 |
| Handover memo | URL, username, workflow | Support Team | i00710 | 26.03.2021 22:46:52 |
| Problem description | Product Area ABC | Customer ABC | Cust51312 | 26.03.2021 00:41:50 |

510

500

FIG. 5

MICROSERVICES FOR ASSESSING CLIENT EXPERIENCE IN INCIDENT MANAGEMENT

BACKGROUND

Incident management is an important feature in any computing system. Modern enterprise systems involve many different hardware components and software applications, the scale of which can be too complex to be incident free. An incident can cause unplanned interruptions or reductions in quality of information technology (IT) services. Such incident can occur in internal services (e.g., a broken printer, a computer crash, etc.) or external services (e.g., email server cannot be connected, network connection is down, etc.). After an incident occurs, a client or user negatively affected by the incident can file an incident ticket, which is delivered to responsible administrators (e.g., service desk administrators) who can troubleshoot the incident and take appropriate actions to resolve the underlying problems. Typically, an incident management system can manage the lifecycle of incidents in an enterprise environment, tracking and/or logging incidents from generation of incident ticket to resolution. Client experience of interacting with the incident management system often plays an important role of winning customer-centric opportunities. However, assessing client experience in incident management can be problematic. Accordingly, room for improvement exists.

BRIEF DESCRIPTION OF THE DRAWINGS

FIG. 4 shows an example data table stored in an incident database and a corresponding data table stored in a client experience database.

FIG. 5 shows a data table illustrating information contained in an example incident ticket.

DETAILED DESCRIPTION

Figure 1:
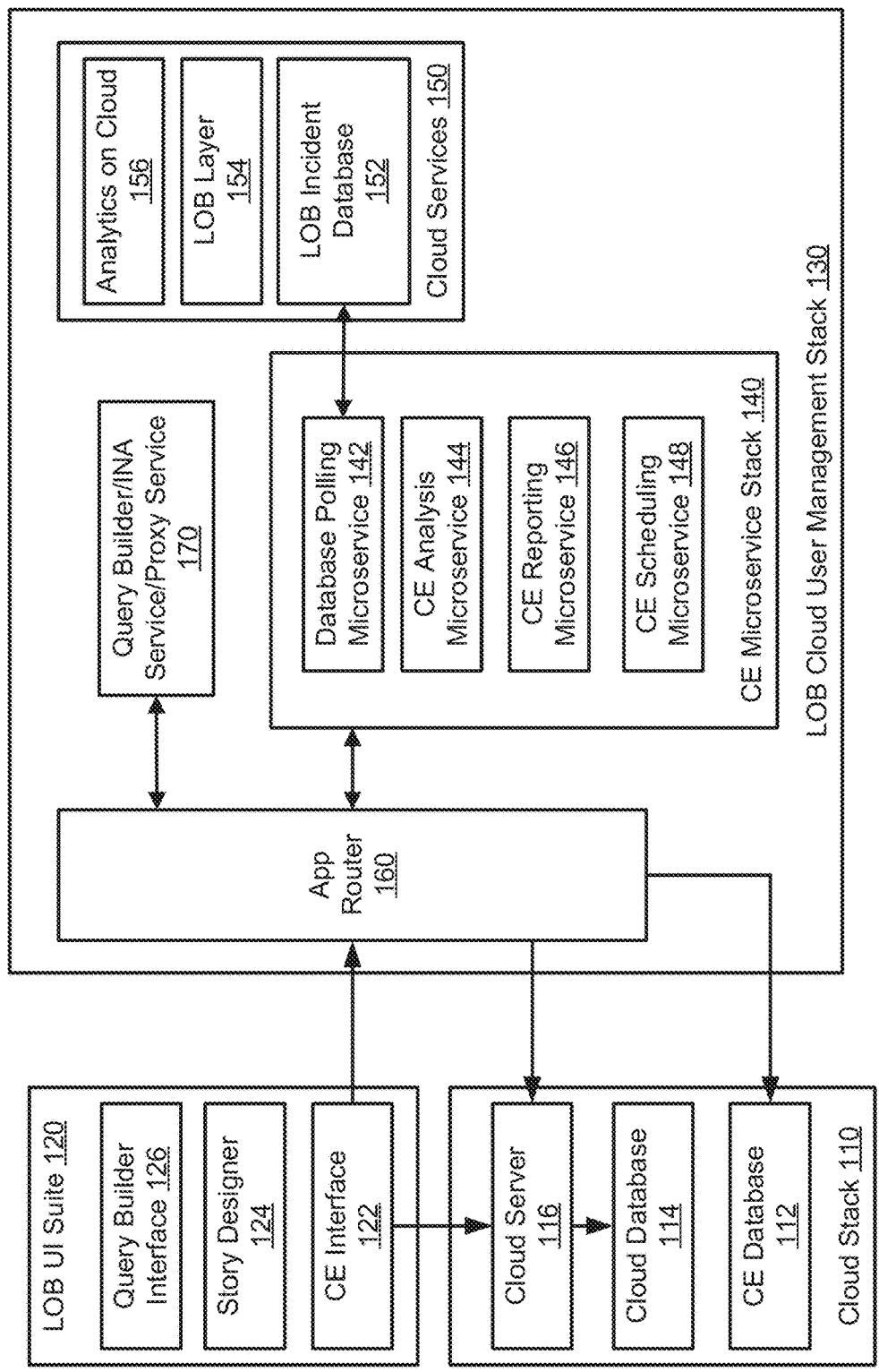
FIG. 1 is an overall block diagram of an example computing system for assessing client experience in incident management.

Example 1—Overview of Client Experience in Incident Management

Incident management system is utilized by many organizations through engagement with the service desk or self-help technology for rapid service restoration after unplanned interruptions or reductions in quality of IT services caused by incidents. In a typical incident management system, after an incident is reported by a client, an incident ticket can be opened by the client or the organization's service desk. Communications between the client and the service desk (and/or other technical support members) on the open incident ticket can be stored in an incident log. Generally, open incident tickets are monitored/tracked until they are resolved and/or closed.

Efficient and responsive incident management is critical to organizations because it not only can reduce or mitigate service interruptions caused by incidents, but also can play an important role in client relationship management. Clients interact with the incident management system when they need support, help, customization, and/or bug fixing. After receiving an incident ticket, the service desk, sometimes working along with product support team and/or engineering team, is expected to provide timely and effective technical support (e.g., workaround, document related help, workflow optimization, bug fixes, etc.) in order to close the incident ticket in a timely manner.

Client experience of interacting with the incident management system of an organization often plays an important role of retaining existing clients and/or attracting new clients. In one example, positive client experience can often lead to more licenses and/or subscriptions of the organization's products. For instance, a highly satisfied client who has received excellent incident support for a product may upgrade from trial licenses to subscriptions/licenses, or increase/expand its subscriptions/licenses to the product. On the other hand, a client who has had a negative experience when interacting with the incident management system may decide to drop the product or switch to a competitor's product.

Thus, assessing client experience in incident management can help an organization to improve the quality of its customer service and/or guide its decision-making process. For example, by assessing client experience in incident management, the organization can identify if any of its products leads to client dissatisfaction, if more resources need to be added to a support team, and/or if there is a recent trend of client experience that justifies certain organizational decisions (e.g., to upgrade or discontinue a product, to increase or reduce training for the client, etc.).

However, assessing client experience in incident management has mostly relied on surveys, which are often time consuming and generally only provide anecdotal, incomplete, or inaccurate information about client experience. Thus, it would be advantageous for an improved system and method that supports more objective, quantitative, and efficient assessment of client experience in incident management. Such improved technologies for assessing client experience in incident management can be applied across a wide variety of enterprise software environments.

Example 2—Overview of Example System for Assessing Client Experience in Incident Management FIG. 1 shows an overall block diagram of an example computing system 100 for assessing client experience in incident management. As shown, the computing system 100 includes a cloud stack 110, a cloud user management stack 130, and a user interface (UI) suite 120.

The cloud user management stack 130 and the user interface suite 120 can be specific to a line-of-business (LOB) of an organization, e.g., the LOB can be related to a set of products and/or services offered by the organization. The cloud stack 110 can be an open source computing platform that allows IT service providers to offer public cloud services. In the depicted example, the cloud stack 110 includes a cloud server 116 in communication with a cloud database 114. In addition, the cloud stack 100 can have a dedicated client experience (CE) database 112, as described further below.

The user interface suite 120 includes a set of tools that allows a user to interact the cloud stack 110 and the cloud user management stack 130. For example, the user interface suite 120 can include a query builder interface 126 which allows the user to search and filter database objects, select objects, create relationship between objects, etc. As another example, the user interface suite 120 can also include a story designer 124 (e.g., Scenes provided by SAP SE, of Walldorf, Germany or others) which allows the user to create storyboards about products and services offered by the organization. As shown, the user interface suite 120 can further include a client experience interface 122 interacting with both the cloud stack 110 and the LOB cloud user management stack 130.

The LOB cloud user management stack 130 includes an application router 160 (e.g., AppRouter provided by SAP SE, of Walldorf, Germany or others), which interacts with both the LOB user interface suite 120 and the cloud stack 110. In any of the examples herein, the application router 160 can provide a single entry point to an enterprise application that comprises several different applications or microservices. Specifically, the application router 160 can be configured to dispatch requests to backend microservices, authenticate users, serve static content, among other capabilities.

In any of the examples herein, microservices (also known as microservices architecture) refers to an architectural approach in which a single application is composed of suites of loosely coupled and independently deployable smaller components, or services. In contrast to the conventional approach where a monolith application is built as a single, autonomous unit, the microservices are built as modular as possible. Generally, the microservices can be written in different programming languages and may use different data storage techniques, yet they can be connected to each other via an application programming interface (API) such as RESTful API. As a result, the microservices are more scalable and flexible, and are particularly useful for deployment in a cloud computing environment.

In the depicted example, the LOB cloud user management stack 130 includes a plurality of applications 170, which can be deployed as microservices. In one example, the applications 170 can include a query builder service (e.g., BusinessObjects Query Builder provided by SAP SE, of Walldorf, Germany or others), and the application router 160 can forward a user's query request (e.g., entered via the query builder interface 126) to the query builder service. In other examples, the applications 170 can include an information access service (e.g., the INA query model provided by SAP SE, of Walldorf, Germany or others) configured to enable applications to perform analytics, planning, and search on data stored in the cloud database 114, a proxy service, and other services.

As shown, the LOB cloud user management stack 130 also includes a plurality of cloud services 150 such as analytics on cloud 156, a LOB layer 154, and a LOB incident database 152 (also referred to as "incident database"). As described herein, the incident database 152 is a data repository of incidents that occurred in the LOB of the organization. In other words, the incident database 152 can log incident tickets reported by clients in the LOB, and an incident ticket can include a log of events or message communications which run from the opening of the incident ticket until the incident ticket is closed. Thus, as described herein, an incident ticket can also be referred to as an "incident log entry" or an "event log entry." The message communications in an incident ticket can be communications between a client and a service desk administrator, between a client and a support team, between a support team and a technical team, or between any parties, so long as the message communications are relevant to the incident ticket (e.g., they share the same incident identifier, as described below). Opening incident tickets in the incident database 152 and log message communications in corresponding incident tickets can be implemented by any incident management system embedded within or in connection with the LOB cloud user management stack 130.

In addition, the LOB cloud user management stack 130 also includes a client experience microservice stack 140, which can include four microservices: a database polling microservice 142, a client experience analysis microservice 144, a client experience reporting microservice 146, and a client experience scheduling service 148. In certain embodiments, the client experience reporting microservice 146 and the client experience scheduling service 148 can be combined. As shown, the client experience microservice stack 140 can communicate with the client experience interface 122 and the client experience database 112 via the application router 160. As described below, these microservices can be deployed independently but work together to assess client experience in incident management.

Generally, the database polling microservice 142 can poll or retrieve incident tickets from the incident database 152 and compare the retrieved incident tickets with corresponding incident records stored in the client experience database 112. As described herein, the incident database 152 can be referred to as the "first database" and the client experience database 112 can be referred to as the "second database." The client experience analysis microservice 144 can analyze the retrieved incident ticket and calculate a corresponding client experience index (CEI) which provides an objective and quantitative measure of client experience associated with the incident ticket. The client experience analysis microservice 144 can further calculate one or more aggregated CEIs for a plurality of retrieved incident tickets based on certain aggregation criteria. The calculated CEIs corresponding to the retrieved incident tickets can be stored or updated in the client experience database 112. The client experience reporting microservice 146 can be configured to generate client experience reports containing the calculated CEIs and/or aggregated CEIs according to certain predefined reporting formats. The client experience scheduling microservice 148 can allow a use to schedule the generation of client experience reports.

In practice, the systems shown herein, such as system 100, can vary in complexity, with additional functionality, more complex components, and the like. For example, there can be additional functionality within the cloud stack 110, the LOB user interface suite 120, and/or the cloud user management stack 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the incident tickets, the communication messages, the priority and/or weight factors, the CEIs and/or aggregated CEIs, and the like can be stored in one or more computer-readable storage media or computer-readable storage devices. The technologies described herein can be generic to the specifics of operating systems or hardware and can be applied in any variety of environments to take advantage of the described features.

Figure 2:
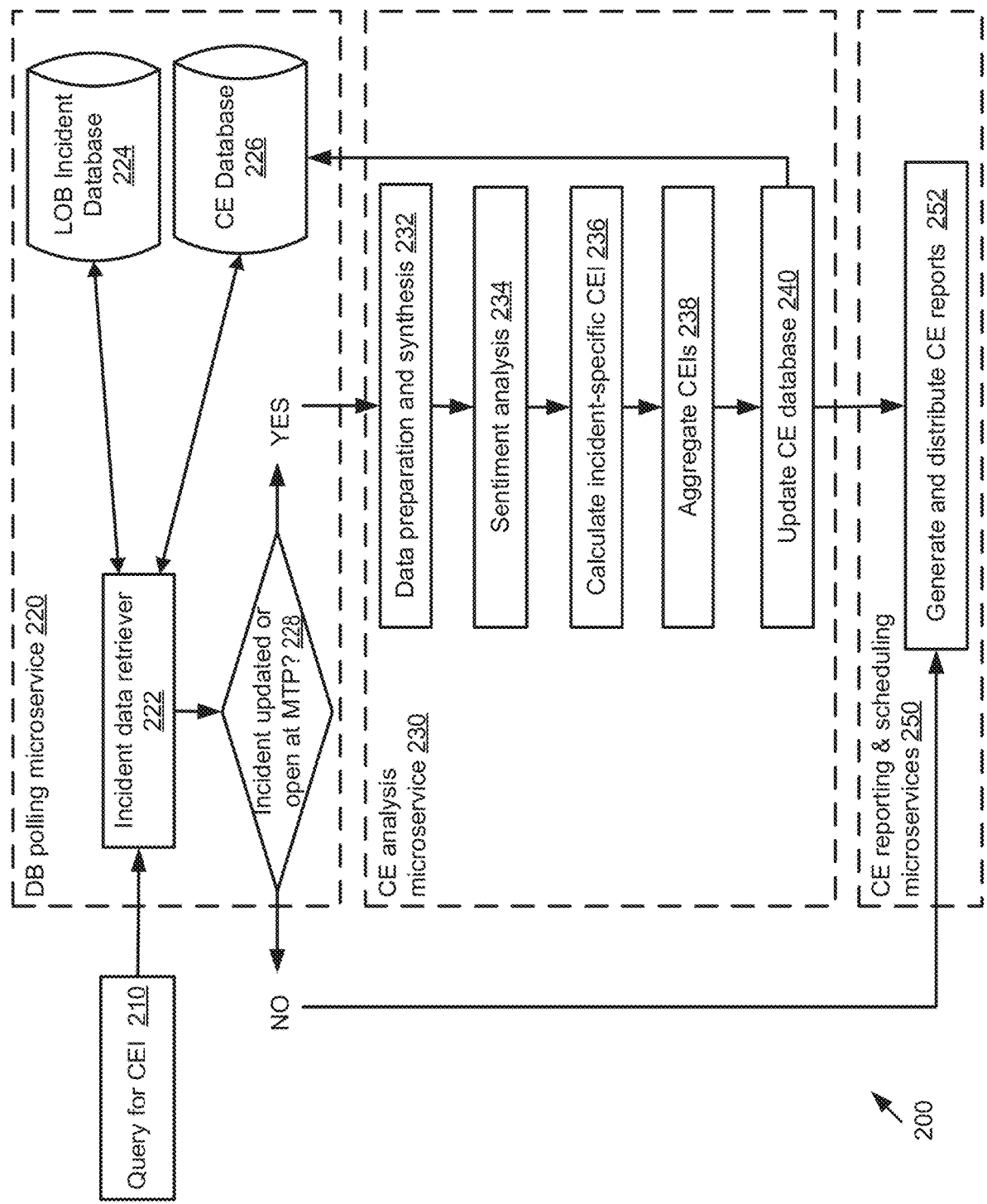
FIG. 2 is a flow diagram illustrating an example process of assessing client experience in incident management based on microservices.

Example 3—Example Microservices for Assessing Client Experience in Incident Management FIG. 2 shows a flow diagram 200 illustrating an example process of assessing client experience in incident management based on microservices. In this example, a database polling microservice 220 (similar to 142), a client experience analysis microservice 230 (similar to 144), and a client experience reporting and scheduling microservice 250 (similar to the combination of 146 and 148) are shown for illustrative purposes.

A request to access client experience, e.g., in the form of a query for CEI 210, can be handled by the database polling microservice 220. Specifically, the database polling microservice 220 can have an incident data retriever 222 configured to retrieve an incident ticket from an incident database 224 (similar to 152) and a corresponding incident record from a client experience database 226 (similar to 112). As described further below, the incident record include previously calculated CEI associated with the incident ticket and other relevant information about the incident ticket. The database polling microservice 220 can compare (e.g., at 228) the retrieved incident ticket with the incident record to determine if there has been any update on the incident ticket since the last assessment of client experience with respect to the incident ticket.

If there has been an update on the incident ticket since the last assessment of client experience with respect to the incident ticket or if the incident ticket remains open at a prescribed target time (e.g., the comparison at 228 returns "yes"), the client experience analysis microservice 230 can be deployed to perform a series of operations including data preparation and synthesis (e.g., at 232), sentiment analysis (e.g., at 234), calculating CEI associated with the incident ticket (e.g., at 236), aggregating CEIs (e.g., at 238), and updating the client experience database 226 (e.g., at 240). After such updating operation, the incident record in the client experience database 226 contains the newly calculated CEI associated with the incident ticket. In addition, the aggregated CEIs can also be updated in the client experience database 226. Then, the client experience reporting and scheduling microservice 250 can be deployed to generate and distribute client experience reports (e.g., at 252) based on the calculated CEIs and/or aggregated CEIs.

On the other hand, if there has been no update on the incident ticket since the last assessment of client experience with respect to the incident ticket and the condition that incident ticket remains open at the prescribed target time is not met (e.g., the comparation at 228 returns "no"), the client experience reporting and scheduling microservice 250 can be deployed directly without calling the client experience analysis microservice 230. Instead, the client experience reporting and scheduling microservice 250 can generate and distribute client experience reports based on CEI data previously calculated and stored on the client experience database 226.

Figure 3:
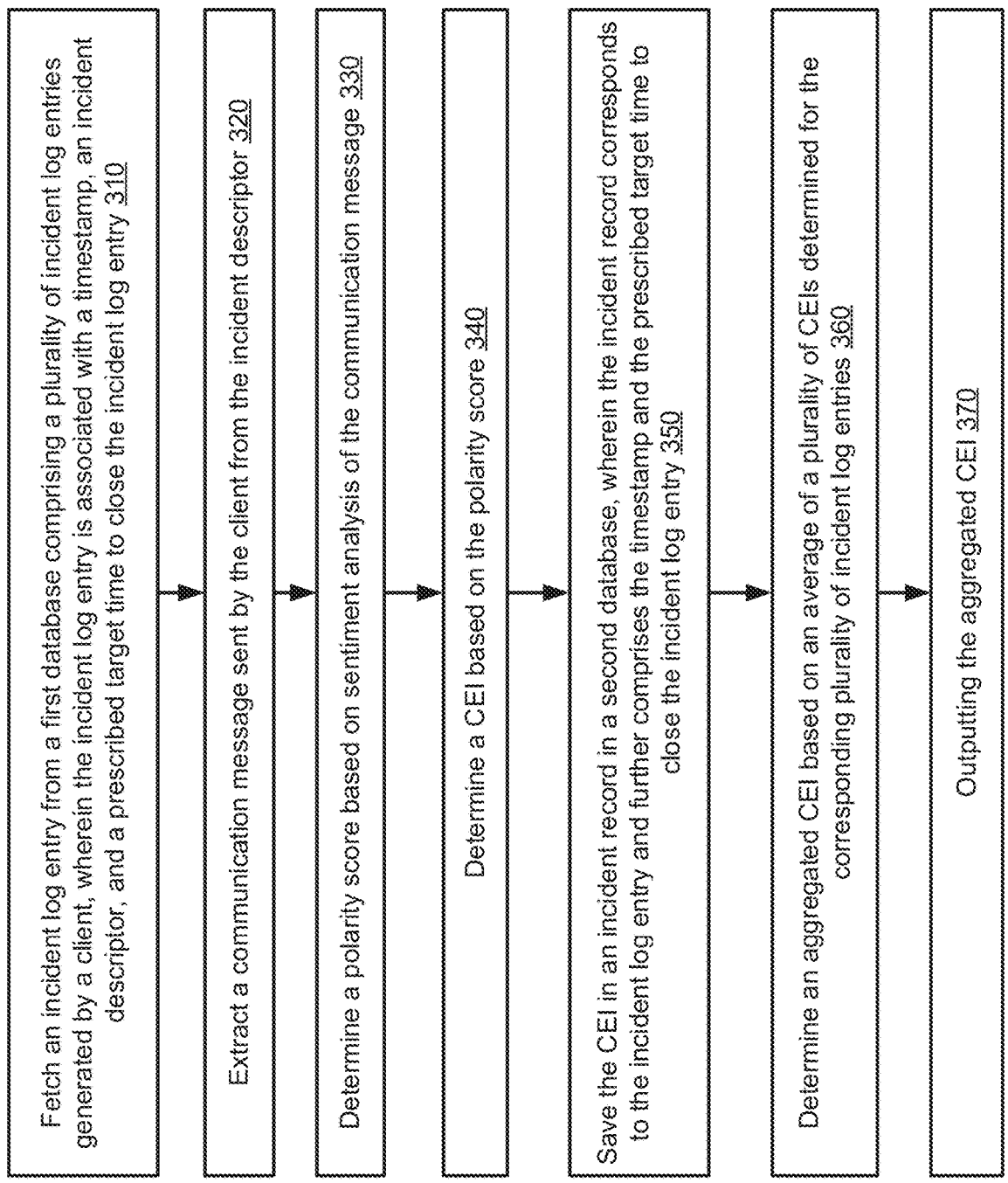
FIG. 3 is a flowchart illustrating an overall method of assessing client experience in incident management.

Example 4—Example Overall Method of Assessing Client Experience in Incident Management FIG. 3 is a flowchart 300 illustrating an overall method of assessing client experience in incident management and can be performed, for example, by the system of FIG. 1.

At 310, the database polling service (e.g., 142 or 220) can fetch an incident ticket (i.e., incident log entry, or event log entry) from a first database (e.g., the incident database 152 or 224) comprising a plurality of incident tickets generated by a client. The incident ticket is associated with (e.g., the incident ticket can comprise or point to) a timestamp, an incident descriptor (also referred to as "event descriptor"), and a prescribed target time to close the incident ticket. In certain embodiments, the incident ticket can be associated with (e.g., comprise or point to) other relevant information. For example, the incident ticket can be associated with an incident response frequency (IRF) prescribed for the incident ticket (e.g., by a service-level agreement), wherein the IRF can specify a number that the client should be communicated to before closing the incident ticket.

To illustrate, FIG. 4 shows an example data table 420 stored in an incident database, which includes a plurality of incident tickets 422 arranged in rows, each having a unique incident identifier (ID), a last-modified timestamp, an incident descriptor, an assigned priority, and a maximum time permitted (MTP) to resolve the incident ticket (i.e., the MTP specifies a target time to close the corresponding incident ticket). Other relative information about the incident tickets 422 (e.g., IRF) can also be added to the data table 420 as additional columns. In the depicted example, the first row of the data table 420 shows an incident ticket with a unique incident ID 15672, which was assigned to "very high" priority, was last updated at LOAM on Jul. 5, 2020, and is expected to be closed by LOAM on Jul. 15, 2020.

Typically, an incident management system can automatically generate an incident ID when a new incident ticket is opened. The priority of the incident ticket can be selected from a predefined, ranked list (e.g., "very low," "low," "medium," "high," and "very high"). In certain embodiments, the priority of the incident ticket can be directly assigned by the client when opening the incident tickets. In other embodiments, the priority of the incident ticket can be generated or modified by a service desk professional based on evaluation of the incident ticket. The incident management system can also automatically prescribe an MTP for any new incident ticket based on the time the incident ticket is opened and the assigned priority of the incident ticket (e.g., the default MTP can be set to be 10 days after the time when the incident ticket is opened). In certain embodiments, the MTP can be modified by the service desk professional.

When there is an update on an incident ticket, the incident management system can automatically update the last-modified timestamp of the incident ticket. The initial last-modified timestamp is the time when the incident ticket is opened. Afterwards, anytime when a communication related to the incident ticket is logged in the incident database, the time of the communication can be used to update the last-modified timestamp of the incident ticket. For example, when the client sends an email to the service desk, the incident management system can log such email to the incident ticket and update the last-modified timestamp of the incident ticket to the timestamp of the client's email.

The incident descriptor includes a textual description about the incident ticket. Generally, the incident descriptor can include a client problem statement and threads of communications related to the incident ticket. The incident problem statement can be a subject line when the incident ticket is opened, or can be extracted from the threads of communications related to the incident ticket.

For illustrative purposes, FIG. 5 shows a data table 500 which shows communication messages or threads of communications 510 contained in an example incident ticket, including message type, message lines, user description, user ID, message timestamp, etc. The message lines refer to the threads of communications. The incident descriptor can include the text of message lines of the incident ticket. As described below, the incident descriptor (or the message lines) can be used to extract communication messages originated from the client for sentiment analysis. In the depicted example, the third and eighth rows correspond to two messages sent from a client who can be uniquely identified by the user ID "Cust51312" and user description "Customer ABC." As noted above, anytime a communication message pertaining to the incident ticket is sent, its corresponding message timestamps can be used to update the last-modified timestamp of the incident ticket.

Refer again to the flowchart 300 in FIG. 3. At 320, the client experience analysis microservice (e.g., 144 or 230) can extract a communication message sent by the client from the incident descriptor. Such extraction can be performed by finding tags associated with the client (e.g., finding rows associated with the client's user ID and/or matching client's user description, as explained above).

At 330, the client experience analysis microservice (e.g., 144 or 230) can determine a polarity score based on sentiment analysis of the communication message, as described further below.

At 340, the client experience analysis microservice (e.g., 144 or 230) can determine a client experience index (CEI) based on the polarity score.

At 350, the client experience analysis microservice (e.g., 144 or 230) can save or update the CEI in an incident record in a second database (e.g., the client experience database 112 or 226). The incident record corresponds to the incident ticket and can further comprise the last-modified timestamp and the prescribed target time to close the incident ticket.

To illustrate, FIG. 4 shows an example data table 410 stored in a client experience database, which corresponds to the data table 420 stored in the incident database. As shown, the data table 410 contains a plurality of incident records 412 corresponding to the incident tickets 422 shown in data table 420. An incident record 412 contains the corresponding incident ID, the last-modified timestamp, and the MTP of the corresponding incident ticket 422. In addition, an incident record 412 contains a calculated CEI, which can be automatically updated by the client experience analysis microservice. Note that the incident record does not contain incident descriptor, which includes threads of message communications. Thus, the data table 410 can be much smaller, and require significantly less memory, than the data table 420.

At 360, the client experience analysis microservice (e.g., 144 or 230) can determine an aggregated CEI based on an average of a plurality of CEIs determined for the corresponding plurality of incident tickets, as described below.

Then, at 370, the client experience reporting microservice (e.g., 146 or 240) can output the aggregated CEI, e.g., in a client experience report, as described below.

The method shown in FIG. 3 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example 5—Example Database Polling Microservice

In any of the examples herein, the database polling microservice (e.g., 142 or 222) can fetch the incident tickets from the incident database (e.g., 152 or 224) via on-demand polling or dynamic polling mechanisms.

In the case of on-demand polling, fetching an incident ticket from the incident database is triggered by a request from a user. For example, an administrator can enter a command to trigger the database polling microservice when the administrator needs to prepare a latest report on client experience across different clients, multiple products, and/or different departments/teams. In the case of dynamic polling, fetching the incident ticket from the incident database can be performed according to a predefined timetable. For example, the database polling microservice can have configurable scheduling tasks (e.g., using Cron jobs to configure the fetching task to be run based on a predefined frequency, e.g., every 1 day, every 12 hours, etc.). A POST request can then fetch the relevant data from an incident ticket (e.g., with a specified incident ID) based on the scheduled time/frequency.

For either on-demand polling or dynamic polling, the database polling microservice can be optimized to improve efficiency. Specifically, data polling is enabled only when there is a need to update the CEI corresponding to an incident ticket. Such need can arise in two conditions: (1) when there is an update on the incident ticket, e.g., due to a new client communication, and (2) when the MTP associated with the incident ticket has expired but the incident ticket still remains open (see e.g., condition check 228 in FIG. 2). Updating the CEI corresponding to the incident ticket requires deployment of the client experience analysis microservice (e.g., 144 or 230), which can consume computing resources. Thus, by disabling data polling when there is no need to update the CEI (e.g., when neither of the above two conditions is met), operational efficiency can be improved.

In certain embodiments, fetching an incident ticket from the incident database can be conditioned on the last-modified timestamp of the incident ticket stored in the incident database being different from the last-modified timestamp in the incident record stored in the client experience database. Thus, fetching the incident ticket from the incident database is responsive to comparing the last-modified timestamp of the incident ticket and the last-modified timestamp in the incident record. In other words, the database polling microservice can compare the last-modified timestamp of the incident ticket stored in the incident database with the last-modified timestamp of the incident record stored in the client experience database. The database polling microservice can fetch the incident ticket from the incident database if its associated last-modified timestamp is later (i.e., newer) than the last-modified timestamp of the corresponding incident record stored in the client experience database. Unless the incident ticket remains open at the MTP (which is another condition that can enable data polling, as described below), no fetching is performed if the last-modified timestamp of the incident ticket is the same as the last-modified timestamp of the incident record (i.e., the incident ticket has not been updated with new client communication since the last calculation of CEI corresponding to the incident ticket).

In certain embodiments, the database polling microservice can be configured to fetch an incident ticket from the incident database when the prescribed MTP expires and the incident ticket remains open. Thus, expiration of the MTP while the incident ticket is still open can enable the database polling microservice to fetch the incident ticket and recalculate/update the CEI corresponding to the incident ticket. In other words, the database polling microservice is enabled to fetch the incident ticket from the incident database if the associated last-modified timestamp has been updated compared to the last-modified timestamp of the corresponding incident record stored in the client experience database or if the incident ticket is not closed at the expiration of MTP.

Example 6—Example Client Experience Analysis Microservice

Figure 6:
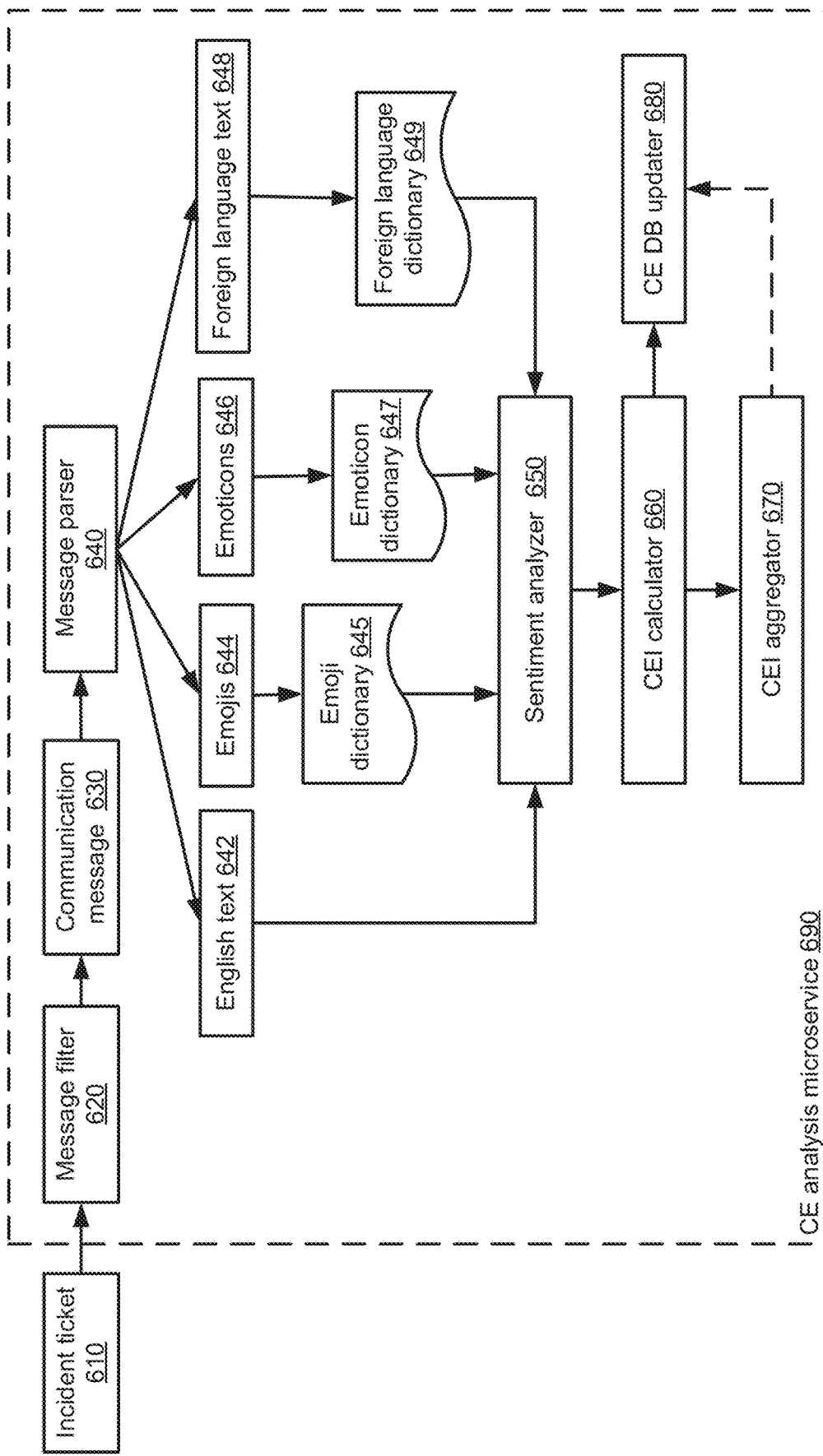
FIG. 6 is a flow diagram illustrating analytical operations implemented by a client experience analysis microservice.

FIG. 6 shows a flow diagram 600 illustrating analytical operations implemented by a client experience analysis microservice 690, which can be an example embodiment of 144 or 230.

As shown, an incident ticket 610, which is fetched by a database polling service described above, can be fed to a message filter 620. The message filter 620 can extract client's communication message 630 from the incident descriptor contained in the incident ticket 610, e.g., by finding tags associated with the client (e.g., based on client's user ID and/or client's user description), as described above.

The extracted communication message 630 can be sent to a message parser 640, which can be configured to parse the communication message 630 into separate parts including English text 642, emojis 644, emoticons 646, and foreign language text 648. In the depicted example, the English text 642 can be fed directly to a sentiment analyzer 650 for sentiment analysis. On the other hand, the emojis 644, emoticons 646, and foreign language text 648 can be translated into plain English text via respective dictionaries 645, 647, and 649 before providing input to the sentiment analyzer 650. Such translation is necessitated because client sentiment (e.g., happy, frustrated, etc.) may be expressed in non-English text, for example, through emojis, emoticons, and/or foreign language.

The sentiment analyzer 650 can perform sentiment analysis of the input data and generate a normalized polarity score as output. Based on the calculated polarity score, a client experience index calculator 660 can calculate the CEI corresponding to the incident ticket. Through a client experience database updater 660, the newly calculated CEI can be used to update the corresponding incident record stored in the client experience database. In addition, the calculated CEI can be used to generate one or more aggregated CEIs by an CEI aggregator 670. In certain embodiments, the aggregated CEIs can also be stored/updated in the client experience database so that they can be used to generate client experience reports.

Figure 7:
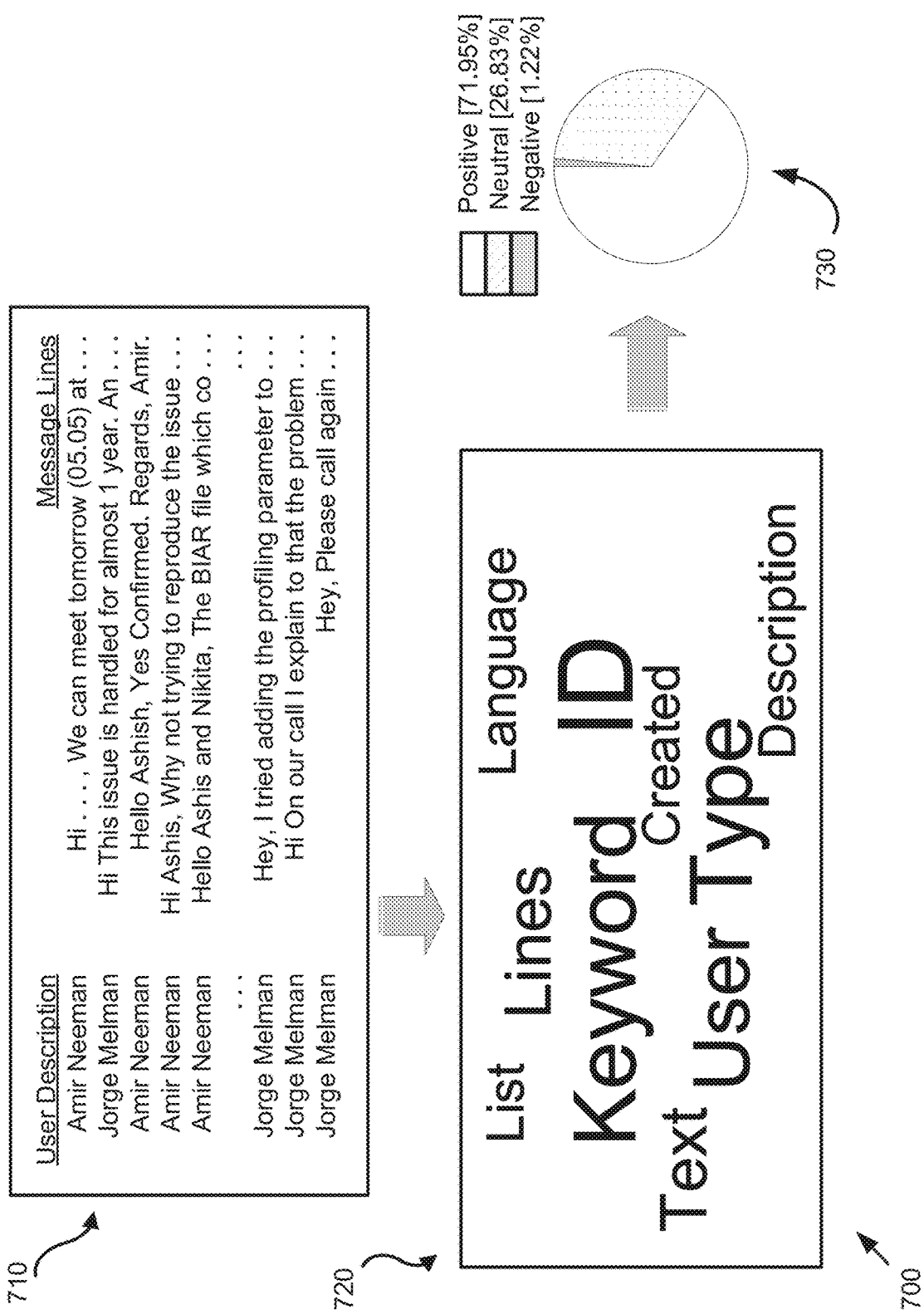
FIG. 7 is a diagram illustrating performing sentiment analysis on client communications.

Example 7—Example Method of Quantifying Client Sentiment from an Incident Ticket In any of the examples herein, a client experience analysis microservice (e.g., 144, 230, or 690) can quantify client sentiment from an incident ticket, as illustrated in FIG. 7.

In the depicted example, an example incident ticket 710 includes threads of communications, including a plurality of communication messages sent from a client whose user description is "Jorge Melman" The incident descriptor of the incident ticket 710 includes the text of message lines of the incident ticket. As noted above, when the client sends a communication message, the last-modified timestamp of the incident ticket can be updated on the incident database (i.e., it will be different from the last-modified timestamp in the incident record stored in the client experience database). Thus, the database polling microservice can fetch the corresponding incident ticket for further analysis.

As noted above, a message filter (e.g., 620) can extract client's communication messages from the incident descriptor, e.g., by finding tags associated with the client (e.g., based on client's user ID and/or client's user description). In the depicted example, the client's communication messages include message lines corresponding to "Jorge Melman" Such extracted communication messages (which can be translated to English text if they contain emojis, emoticons, and/or foreign language text) can be sent to a sentiment analyzer (e.g., 650) for sentiment analysis.

As described herein, sentiment analysis refers to a natural language processing or computational linguistic technique that is configured to determine whether a given text carries positive, neutral, or negative sentiment. Various approaches (e.g., lexicon-based approach, the machine learning approach, etc.) can be used by the sentiment analyzer to conduct sentiment analysis. In certain embodiments, the sentiment analyzer can generate a sentiment word cloud 720 (where the words can be shown in various colors, fonts, sizes, and/or themes), which shows the most frequent words that appear in positive/neutral/negative sentiments embodied by the client's communication messages. The sentiment word cloud 720 can provide an intuitive visualization of client's sentiment expressed in communication messages.

The basic task in sentiment analysis is to determine the sentiment polarity (positivity, neutrality or negativity) of a given text. In certain embodiments, the sentiment analyzer can be configured to generate a pie chart 730 showing sentiment polarity distribution. In the depicted example, positive polarity sentiment is dominant (71.95%), followed by neutral polarity sentiment (26.83%), while the negative polarity sentiment is negligible (1.22%).

In certain embodiments, the sentiment analyzer can quantify the sentiment polarity by calculating a polarity score (PS), which can be a normalized metric ranging from −1 to 1, where a more negative PS indicates more negative sentiment, a more positive PS indicates more positive sentiment, and a PS close to 0 indicates neutral sentiment.

In certain embodiments, message lines of the client in the incident ticket are used for calculating the PS. In certain embodiments, the sentiment analyzer maintains the sentiment analysis results based on previous communication messages of the client contained in the incident ticket. When there is a new client communication message in the incident ticket, the sentiment analyzer can perform a "delta" sentimental analysis based on the new client communication message only. Then, the sentiment analyzer can calculate the PS by aggregating the results of such "delta" sentimental analysis with sentiment analysis results based on previous communication messages.

Example 8—Example Method of Determining Client Experience Index

In any of the examples herein, a client experience index (CEI) corresponding to an incident ticket can be determined based on the polarity score (PS) obtained through sentiment analysis of client communication messages, as described above. Determination of CEI can be performed by a CEI calculator (e.g., 660) which performs one or more calculation steps, as described below. In certain embodiments, the CEI calculator can have a rule engine, which has predefined rules and/or parameters, based on which the calculation steps are performed.

Figure 8:
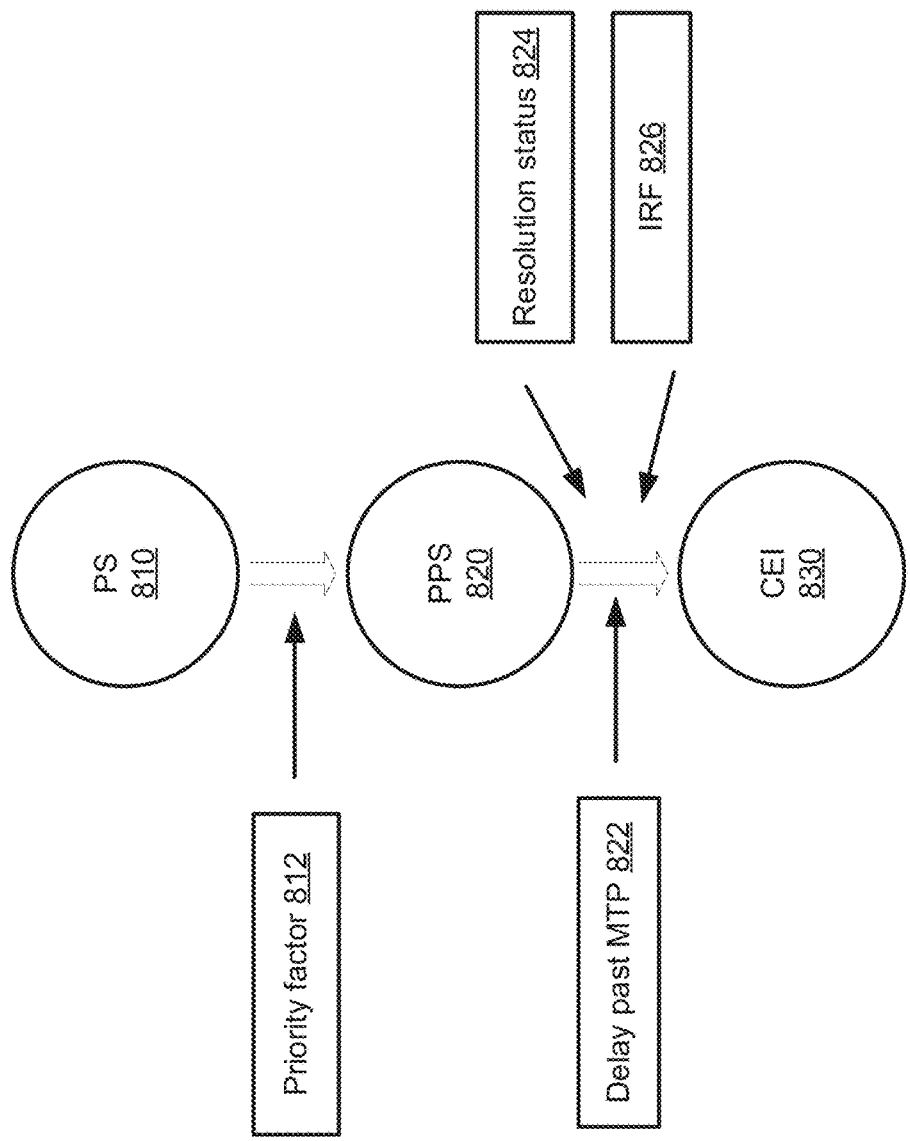
FIG. 8 is a flow diagram illustrating a method of determining client experience index from a polarity score.

As illustrated in FIG. 8, a priority factor (PF) 812 can be applied to a calculated PS 810 to obtain a priority adjusted polarity score (PPS) 820. The PF can be predefined based on a priority indicator assigned to the incident ticket by the client (or the service desk). For example, the PF for "very high" or "high" priority incident ticket can be set to 1.10, and the PF for "medium," "low," or "very low" priority incident ticket can be set to 1.00. To calculate the CEI, the PS can be first multiplied by the corresponding priority factor (i.e., PPS=PS–PF) based on the priority of the incident ticket. While specific examples of applying PF to PS are described above, it is to be understood that the priority factors can be defined in other ways. For example, the priority factors for "very high" or "high" priority incident ticket can be set to different values. In another example, the priority factors for "medium," "low," or "very low" priority may be set to non-unitary values. In alternative embodiments, to calculate the CEI, the priority factor may be added to, instead of being multiplied by, the polarity score.

To calculate the CEI 830, the priority adjusted polarity score (PPS) 820 can be further adjusted by assessing the delay past MTP 822. In certain embodiments, when the incident ticket has not been closed by MTP and there is a further delay past the MTP, the PPS can be adjusted downwardly. In other words, the rule engine assumes that the client experience will decrease when there is a prolonged delay past the MTP.

In one particular embodiment, for every X days of delay (where X can be a predefined number, e.g., X can be 1, 2, 5, 10, etc.) past the MTP, the CEI can be calculated by subtracting a positive Δ1 from PPS, where Δ1 is a predefined value which can be dependent on the priority of the incident ticket. For example, it can be predefined that for "very high" incident ticket, for every X days of delay past the MTP, the CEI can be calculated by subtracting Δ1=0.20 from PPS (the subtracted Δ1 can be smaller, e.g., 0.10, for "high" priority incident ticket). While specific examples of adjusting PPS based on the delay past MTP are described above, it is to be understood that other methods of downward adjustment of PPS based on delay past MTP can be implemented. For example, when the PPS is positive, downward adjustment of PPS can be implemented by multiplying the PPS with a coefficient that is between 0 and 1, and when the PPS is negative, downward adjustment of PPS can be implemented by multiplying the PPS with a coefficient that is greater than 1.

In one particular embodiment, the downward adjustment of the PPS 820 can be further impacted by the resolution status 824 of the incident ticket. For example, if after X days of delay past the MTP, the incident ticket still has not been closed, then the amount of downward adjustment can be increased (e.g., the subtracted value Δ1 can be doubled, or increased by a certain percentage, etc.). In other words, the rule engine assumes that client experience will further decrease if after a certain delay past the MTS, the incident ticket still remains open.

In addition, to calculate the CEI 830, the priority adjusted polarity score (PPS) 820 can be further downwardly adjusted if the incident ticket remains open when the MTP expires and the client receives fewer responses or communications from the service desk and/or other technical/support teams than the prescribed incident response frequency (IRF) 826. For example, when the MTP expires and the incident ticket is open, if the prescribed IRF is 10 (i.e., the client is expected to receive 10 responses or communications from the service desk and/or technical/support teams) but the client only receives 3 such responses or communications, then the PPS can be further reduced by a positive Δ2. Similar to Δ1, Δ2 can be a predefined value which is dependent on the priority of the incident ticket (e.g., Δ2 can be 0.2 for "very high" priority and 0.1 for "high" priority incident ticket). In certain embodiment, the value of Δ2 can be proportional to the different between actual number of responses or communications the client received and the prescribed IRF. In other words, the rule engine assumes that, if the incident ticket has not been closed by the MTP, the fewer responses or communications the client received, the worse is the client experience. Likewise, while specific examples are described above, it is to be understood that other methods of downward adjustment of PPS based on IRF and MTP status can be implemented.

Example 9—Example Method of Aggregating Client Experience Indices

In any of the examples herein, the calculated CEIs corresponding to different incident tickets can be aggregated based on certain aggregation criteria to generate one or more aggregated CEIs, which can be included in incident report(s), as described below. Generation of aggregated CEIs can be performed by a CEI aggregator (e.g., 670) which performs one or more calculation steps, as described below. In certain embodiments, the CEI aggregator can have a rule engine, which has predefined rules and/or parameters, based on which the calculation steps are performed.

Figure 9:
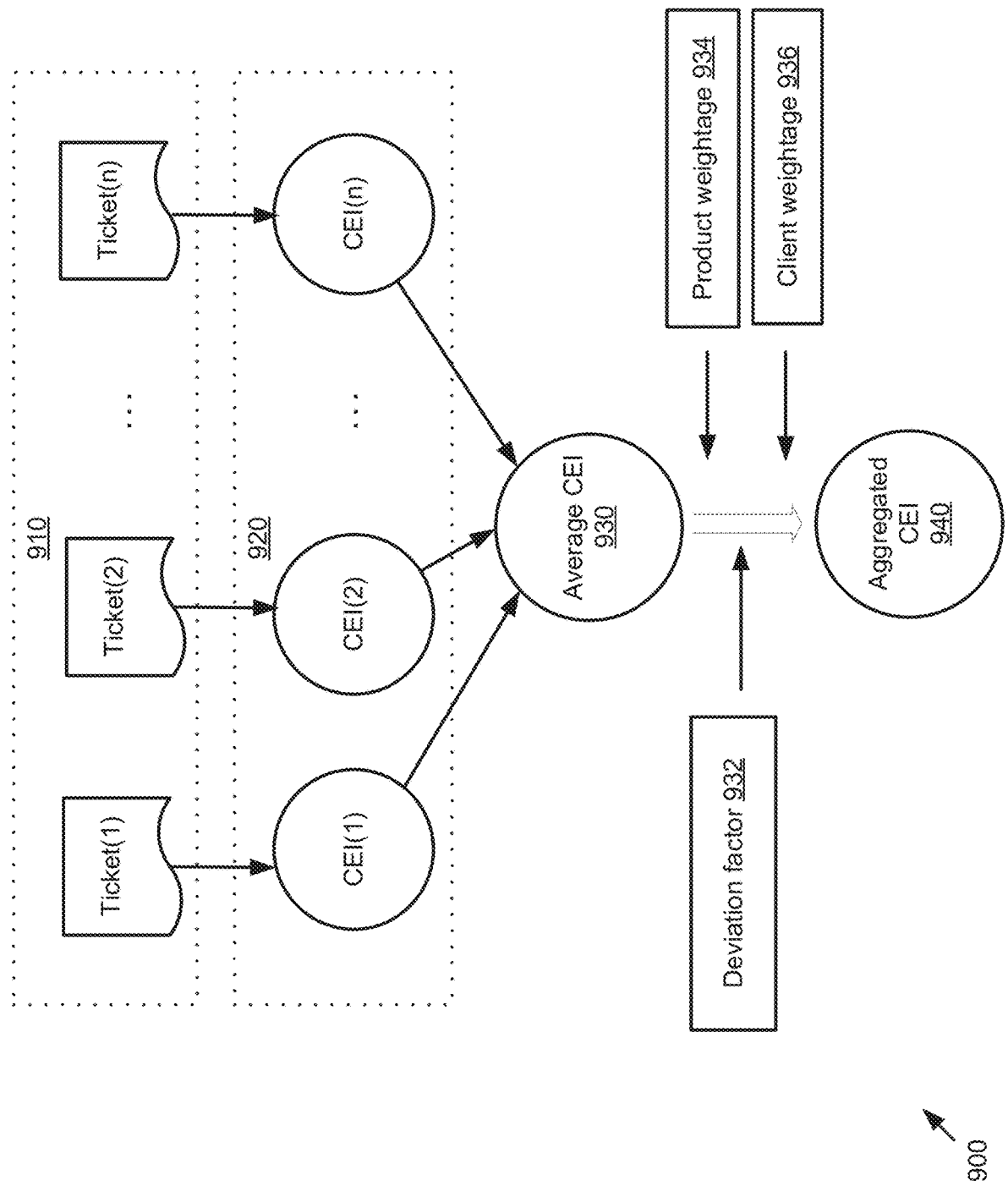
FIG. 9 is a flow diagram illustrating a method of determining aggregated client experience index from a plurality of client experience indices.

As shown in FIG. 9, a plurality of CEIs 920 (e.g., CEI(1), CEI(2), . . . , CEI(n)) can be determined from respective incident tickets 910 (e.g., Ticket(1), Ticket(2), . . . , Ticket(n)), according to the method described above. The plurality of CEIs 920 can form a CEI group, which will be aggregated. The incident tickets 910 that are used to generate the plurality of incident tickets CEIs can form a corresponding incident ticket group. How to determine the members of the CEI group can be based on one or more aggregation criteria (to group incident tickets), depending on what aggregated CEIs need to be included in a client experience report. For example, according to one criterion, the members in a CEI group can be CEIs determined for those incident tickets related to one particular product (e.g., to gain insight of client experience related to that particular product). According to another criterion, the members in a CEI group can be CEIs determined for those incident tickets related to one particular client (e.g., to gain insight of that particular client's experience). According to yet another criterion, the members in a CEI group can be CEIs determined for those incident tickets related to one particular product and involving one particular support team (e.g., to gain insight of client experience of interacting with that particular support team related to that particular product).

As shown in FIG. 9, the plurality of CEIs 920 in the CEI group can be aggregated by calculating an average CEI 930. Other aggregating methods can also be used. For example, in certain embodiments, the aggregation can be performed by calculating a weighted average of the CEIs 920, where the weights associated with different CEIs 920 can be based on priority scores of the corresponding incident tickets 910. In alternative embodiments, the aggregation can be performed to calculate a median (instead of average) of the plurality of CEIs 920.

The average CEI 930 can be further adjusted to generate the aggregated CEI 940 for reporting purposes. Such adjustment can be performed by applying one or more weightages or factors to the average CEI 930. The weightages or factors can be predefined based on one or more attributes of the corresponding incident tickets 910.

In certain embodiments, the incident tickets 910 within the incident ticket group are related to one specific product. To generate aggregated CEI 940, one example adjustment is to apply a deviation factor 922 to the average CEI 930 (e.g., multiplying the average CEI by the deviation factor) based on incoming variation 922 of incident tickets 910. As described herein, the incoming variation of incident tickets can be characterized by a predefined metric that measures temporal variation of the number of new incident tickets 910 within the incident ticket group. For example, the incoming variation can be simply defined as the difference between total number of new incident tickets in the last quarter and total number of new incident tickets in the same quarter one year ago. Other definitions of incoming variation (e.g., based on ratio, percentage difference, etc.) can also be used.

If the specific product is newly released, the deviation factor 922 can be initialized to 1. If the specific product has been used for a period of time, the deviation factor 922 can be adjusted based on the measured incoming variation of incident tickets. In certain embodiments, the deviation factor 922 is increased if there is a significant increase or decrease in the number of new incident tickets based on a trend analysis. The can be implemented by the rule engine, based on the assumption that a significant increase in the number of new incident tickets may indicate that the product has incurred more complaints, whereas a significant decrease in the number of new incident tickets may indicate that the product has been used less frequently. For example, assume based on a trend analysis of new incident tickets occurred in previous periods, between 200 and 500 new incident tickets per quarter is considered a normal range. If the number of new incident tickets in the present quarter is suddenly increased to is 1,000 (or suddenly decreased to 50), the deviation factor 922 can be increased (e.g., doubled to 2.0) accordingly.

In certain embodiments, when the incident tickets 910 within the incident ticket group are related to one specific product, a product weightage 934 can be applied to the average CEI 930 (e.g., multiplying the average CEI by the product weightage). The product weightage 934 can be predefined based on priority or importance of the specific product. For example, the product weightage 934 can be predefined in a range from 1 to 10, where a higher value indicates higher priority and a lower value indicates lower priority of the product. By applying a product weightage 934 to the average CEI 930, the rule engine assumes that high-priority products have more impact on client experience than low-priority products.

In certain embodiments, a client weightage 936 can also be applied to the average CEI 930 (e.g., multiplying the average CEI by the client weightage) for reporting purposes. The client weightage 936 can be predefined based on priority or importance of the specific client. For example, the client weightage 936 can be predefined in a range from 1 to 10, where a higher value indicates higher priority and a lower value indicates lower priority of the client. By applying a client weightage 936 to the average CEI 930, the rule engine assumes that client experience of high-priority clients is more important (and thus need more attention) than low-priority clients.

Example 10—Example Client Experience Reporting and Scheduling Microservices

In any of the examples herein, a client experience reporting microservice (e.g., 146 or 240) can be configured to generate a client experience report which embeds one or more aggregated CEIs according to a predefined format, based on who receives such report. In certain embodiments, the CEI aggregator (e.g., 670) can be implemented in the client experience reporting microservice instead of the client experience analysis microservice.

Figure 10:
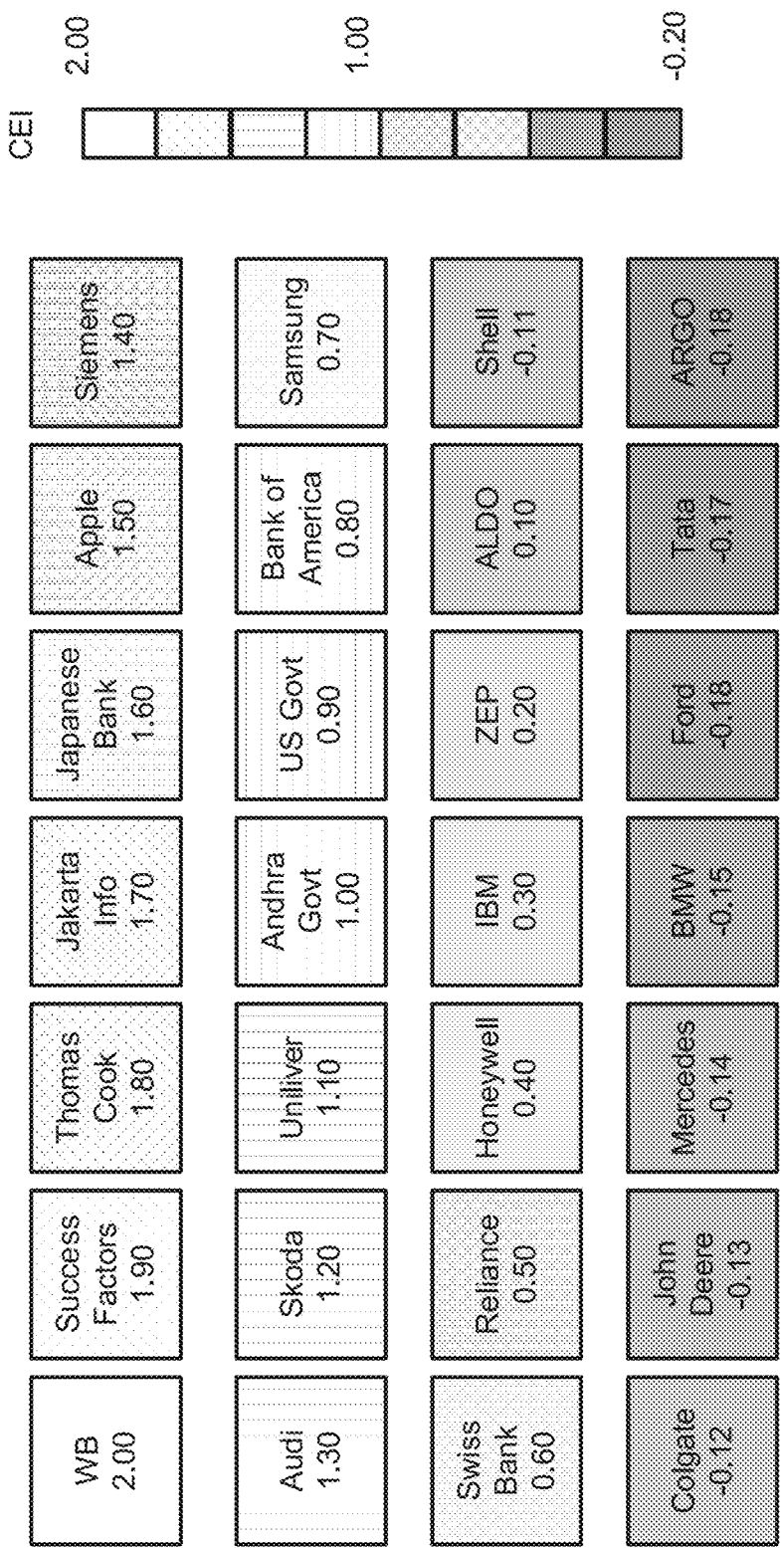
FIG. 10 is a diagram illustrating an example report of aggregated client experience indices for a plurality of clients.

As an example, FIG. 10 shows a dashboard 1000 which displays an array of clients represented by tiles, each tile displaying an aggregated CEI of the corresponding client. The aggregated CEI for each tile can be calculated by aggregating CEIs determined for those incident tickets related to that client (i.e., grouping incident tickets based on client), and applying various weightages, as described above. The tiles can be color-coded or filled with special patterns to give a visual indication of the aggregated CEI values so that a recipient of the report can quickly identify which client(s) have overall positive experience and which client(s) have overall negative experience.

Figure 11:
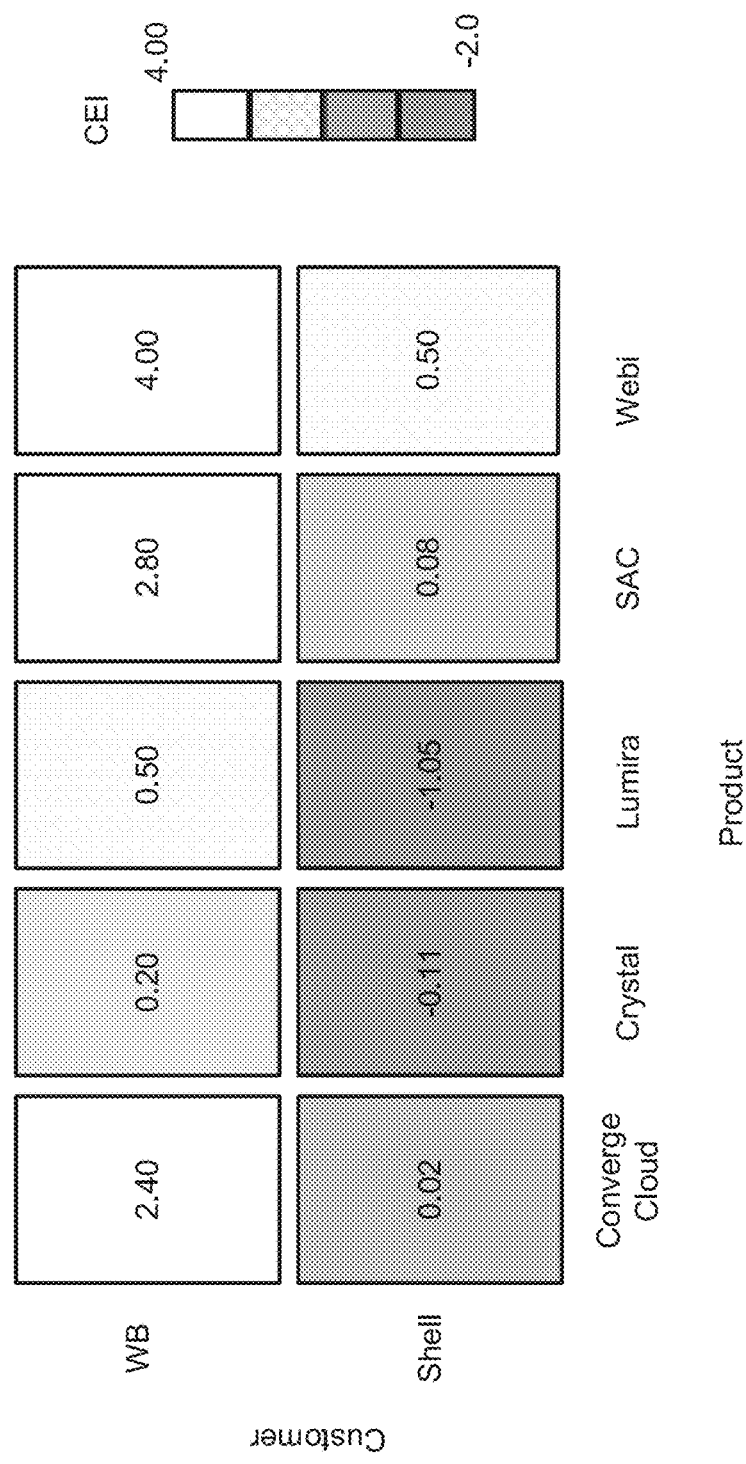
FIG. 11 is a diagram illustrating an example report of aggregated client experience indices for two clients across a plurality of products.

As another example, FIG. 11 shows a dashboard 1100 which displays tiles containing aggregated CEIs with respect to different products (e.g., converge cloud, crystal, Lumira, SAC, Webi) used by two different clients (e.g., WB and Shell). The aggregated CEI for each tile can be calculated by aggregating CEIs determined for those incident tickets related to a specific product used by a specific client (i.e., grouping incident tickets based on both product and client), and applying various weightages, as described above. Similarly, the tiles can be color-coded or filled with special patterns to give a visual indication of the aggregated CEI values so that a recipient of the report can quickly identify which product(s) used by which client(s) have overall positive or negative experience.

Figure 12:
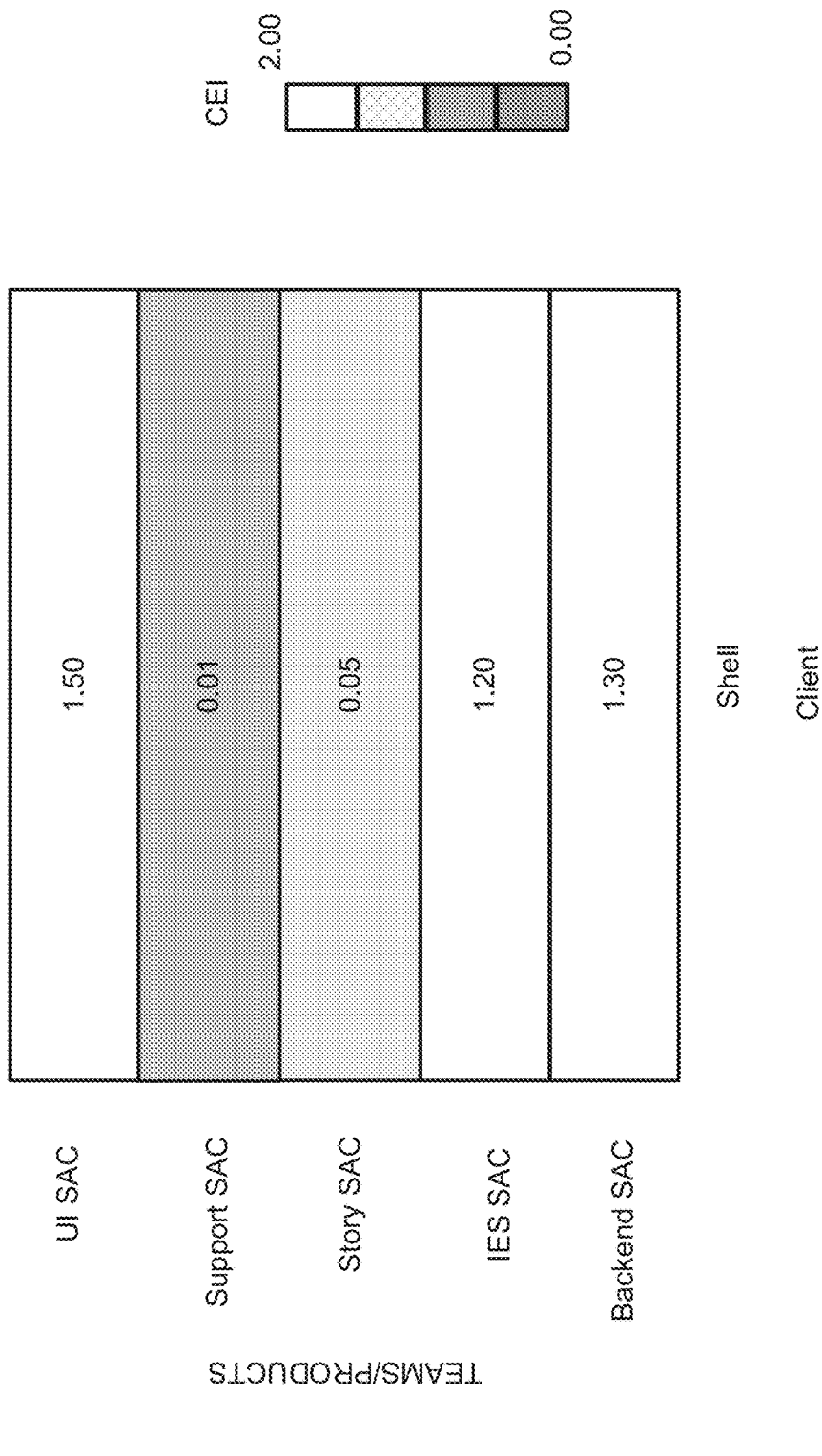
FIG. 12 is a diagram illustrating an example report of aggregated client experience indices for a client across a plurality of teams/products.

In yet another example, FIG. 12 shows a dashboard 1200 which displays tiles containing aggregated CEIs with respect to different teams (e.g., UI, Support, Story, IES, Backend) interacting with one product (e.g., SAC) used by a particular client (e.g., Shell). The aggregated CEI for each tile can be calculated by aggregating CEIs determined for those incident tickets related to a specific team handling the product used by the client (i.e., grouping incident tickets based on team, product and client), and applying various weightages, as described above. Similarly, the tiles can be color-coded or filled with special patterns to give a visual indication of the aggregated CEI values so that a recipient of the report can quickly identify team(s) are associated overall positive experience and which team(s) are associated with overall negative experience.

The client experience report(s) can be presented in other formats that are different from the examples shown in FIGS. 10-12. Depending on who are the recipients, the format of the client experience report(s) can also differ. For example, for a recipient with a high-level position (e.g., CEO), the client experience report may simply present a summary dashboard of a plurality of clients (similar to 1000), followed by a product view of top three premium clients (similar to 1100). Such presentation format can capture high-level client experience information that is useful for board room discussions. For a mid-level manager, the client experience report may provide additional details, for example, aggregated CEIs for different teams (similar to 1200). Such presentation format can capture more granular level details of client experience (e.g., with respect to product, team, and/or individual involved) that is useful for development and/or analysts.

In any of the examples herein, the client experience report can be delivered in electronic form and have interactive features (e.g., hyperlinks, control buttons, etc.) that allow the recipient to easily switch between different representation formats, to filter what information is displayed and what information is hidden, to allow information overview and support drilling down to details, to export the data and/or graphs into external files, etc.

In any of the examples herein, a client experience scheduling microservice (e.g., 148 or 240) can be configured to schedule the generation of client experience reports. For example, the client experience scheduling microservice can be configured so that the client experience reports are generated according to a predefined schedule (e.g., once a day, once a week, etc.) for a particular recipient. Different recipients can receive different formats of client experience reports, and/or according to different schedules. For example, a president or a CEO of the organization may want to receive a high-level report, whereas a mid-level manager may receive a more detailed client experience report.

In certain embodiments, the client experience report(s) can be generated on demand. For example, an administrator can send a command through a user interface (e.g., 122), which triggers the generation of client experience report(s).

In certain embodiments, the client experience report(s) can be automatically generated based on one or more predefined triggering events. For example, one predefined triggering event can be an aggregated CEI corresponding to one specific client (or one specific product, one specific team, etc.) is below a predefined threshold (e.g., 0) which indicates the client experience is becoming negative. Another predefined triggering event can be aggregated CEI corresponding to one specific client (or one specific product, one specific team, etc.) has shown a downward trend for a period of time (e.g., decreasing by 0.5 within 1 month) based on slope analysis. Other triggering events can be similarly defined. By automatically generating client experience report(s) based on triggering events, alerts on degrading client experience (or other concerning issues about client experience) can be timely sent to responsible recipients, who can then take corrective or remedial actions.

The client experience reports can be used in a number of ways. For example, they can be used to evaluate and identify the overall experience (positive, negative, or neutral) and/or trend of experience of a client in different phases of a product. They can be used by the management team to track client experience during different phases of client interaction with different teams, which may reveal if the transition of incident ticket from one team to another team led to improvement or degradation of client experience. Importantly, they can be used to identify gaps in services that lead to lower client experience so that remedial and/or corrective actions (e.g., providing more resources, enhanced education, etc.) can be proactively taken.

Example 11—Example Advantages

A number of advantages can be achieved via the technology described herein.

For example, the client experience microservices described herein (e.g., the database polling microservice, the client experience analysis microservice, the client experience reporting microservice, and the client experience scheduling microservice) can be implemented on top of the any cloud-based analytics module (e.g., the analytics on cloud 156). Thus, these microservices can be easily integrated with existing incident management systems. For example, the client experience microservices described herein can be integrated with the incident management system of an e-commerce platform or a retail platform to assess customer satisfactions with listed products, or they can be integrated with an incident management system of an organization's enterprise software platform to assess customer experience of using various types of IT services provided by the organization.

By accessing the incident database of an incident management system, these microservices can objectively and quantitatively assess client experience in incident management, and generate comprehensive yet intuitive client experience report(s). High efficiency of assessing client experience (e.g., a simple software command can generate client experience reports for hundreds of clients involving thousands of products within a few seconds) is achieved because of the optimization of database polling microservice (i.e., data polling is performed only when there is a need to update the CEI corresponding to in incident ticket). Thus, the technology described herein for objective and quantitative assessment of client experience in incident management can take away any guesswork, and is more accurate and efficient than conventional survey-based assessment methods.

While calculation of aggregated CEI follows a bottom-up approach (e.g., perform sentiment analysis of client communications, then determine CEI for individual incident ticket, before deriving the aggregated CEI), presenting the client experience can follow a top-down approach. For example, a client experience report can be customized to show aggregated CEI for a plurality of clients. It can be drilled down to an individual client to show the aggregated CEI for a plurality of products used by the client, and can be further drilled down to an individual product to show the aggregated CEI associated with different teams with whom the client has interactions.

Based on objective and quantitative assessment of client experience in incident management, an organization can promptly identify issues (e.g., a trend of degrading client experience, a lack of client support by a team, etc.) in incident management that otherwise would be hidden or unrecognized, and thus take corrective measures to resolve the issues. Insights gained from such client experience assessment can also help other decision makings, e.g., whether to upgrade or discontinue a particular product, whether to provide additional training or bring additional resources to a team, etc.

Example 12—Example Computing Systems

Figure 13:
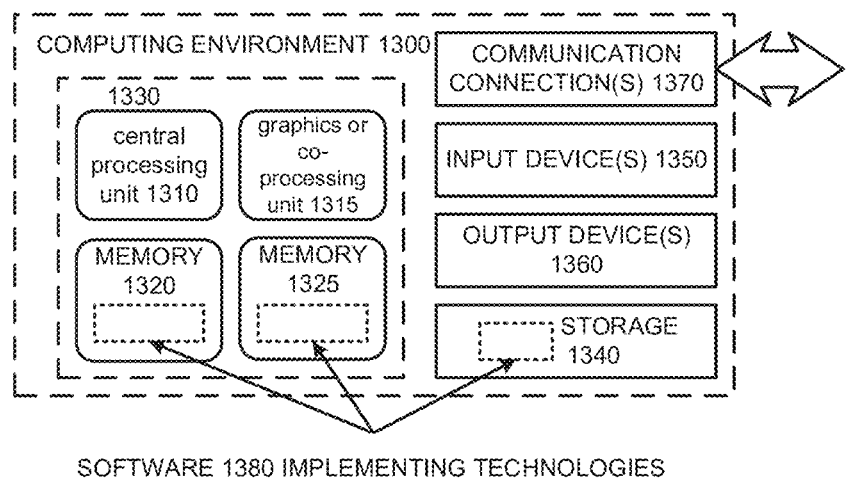
FIG. 13 is a block diagram of an example computing system in which described embodiments can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 13—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 14—Example Cloud Computing Environment

Figure 14:
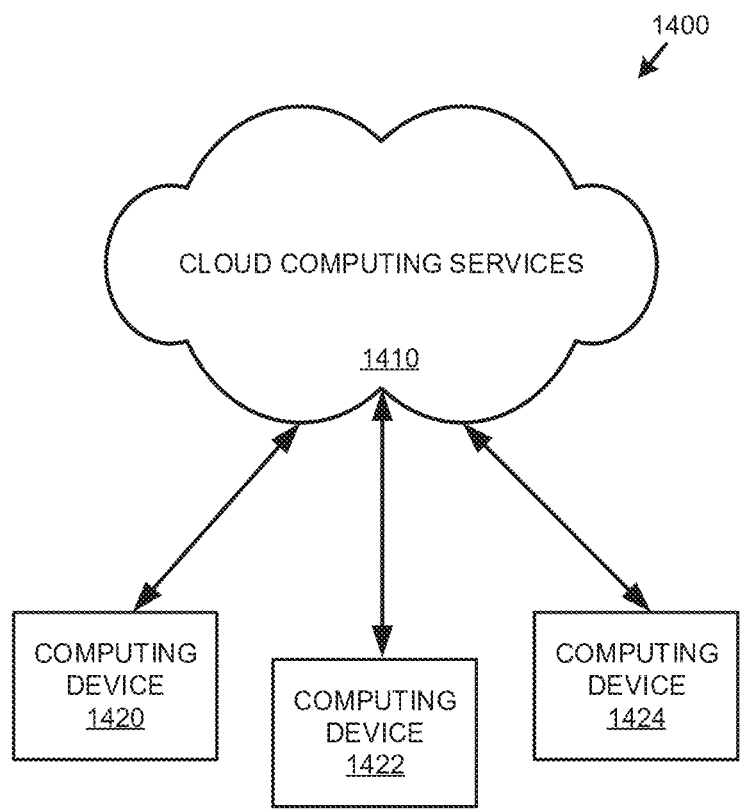
FIG. 14 is a block diagram of an example cloud computing environment that can be used in conjunction with the technologies described herein.

FIG. 14 depicts an example cloud computing environment 1400 in which the described technologies can be implemented, including, e.g., the system disclosed above and other systems herein. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1423. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example 15—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 16—Example Embodiments

Any of the following embodiments can be implemented.

Clause 1. A computer-implemented method comprising: fetching an event log entry from a first database comprising a plurality of event log entries generated by a client, wherein the event log entry is associated with a timestamp, an event descriptor, and a prescribed target time to close the event log entry; extracting a communication message sent by the client from the event descriptor; determining a polarity score based on sentiment analysis of the communication message; determining a client experience index (CEI) based on the polarity score; saving the CEI in an event record in a second database, wherein the event record corresponds to the event log entry and further comprises the timestamp and the prescribed target time to close the event log entry; determining an aggregated CEI based on an average of a plurality of CEIs determined for the corresponding plurality of event log entries; and outputting the aggregated CEI.

Clause 2. The method of clause 1, wherein extracting the communication message comprises searching the event descriptor based on one or more predefined tags.

Clause 3. The method of any one of clauses 1-2, wherein fetching the event log entry from the first database is triggered by a request from a user.

Clause 4. The method of any one of clauses 1-2, wherein fetching the event log entry from the first database is performed according to a predefined timetable.

Clause 5. The method of any one of clauses 1-4, wherein fetching the event log entry from the first database is enabled if the timestamp associated with the event log entry stored in the first database is different from the timestamp in the event record stored in the second database.

Clause 6. The method of any one of clauses 1-4, wherein fetching the event log entry from the first database is enabled if the event log entry is not closed by the prescribed target time.

Clause 7. The method of any one of clauses 1-6, wherein determining the CEI comprises applying a priority factor to the polarity score, wherein the priority factor is determined based on a priority indicator assigned to the event log entry by the client.

Clause 8. The method of any one of clauses 1-7, wherein determining the CEI comprises reducing the polarity score if the event log entry remains open after passing the prescribed target time for a predefined duration.

Clause 9. The method of any one of clauses 1-8, wherein determining the CEI comprises reducing the polarity score if the event log entry remains open at the prescribed target time and a number of communications sent to the client corresponding to the event log entry is less than a predefined value.

Clause 10. The method of any one of clauses 1-9, wherein determining the aggregated CEI comprises applying one or more weightages to the average of the plurality of CEIs, wherein the one or more weightages are predefined based on one or more attributes of the corresponding plurality of event log entries.

Clause 11. A computing system comprising: memory; one or more hardware processors coupled to the memory; and one or more computer readable storage media storing instructions that, when loaded into the memory, cause the one or more hardware processors to perform operations comprising: fetching an event log entry from a first database comprising a plurality of event log entries generated by a client, wherein the event log entry is associated with a timestamp, an event descriptor, and a prescribed target time to close the event log entry; extracting a communication message sent by the client from the event descriptor; determining a polarity score based on sentiment analysis of the communication message; determining a CEI based on the polarity score; saving the CEI in an event record in a second database, wherein the event record corresponds to the event log entry and further comprises the timestamp and the prescribed target time to close the event log entry; determining an aggregated CEI based on an average of a plurality of CEIs determined for the corresponding plurality of event log entries; and outputting the aggregated CEI.

Clause 12. The system of clause 11, wherein fetching the event log entry from the first database is triggered by a request from a user.

Clause 13. The system of clause 11, wherein fetching the event log entry from the first database is performed according to a predefined timetable.

Clause 14. The system of any one of clauses 11-13, wherein fetching the event log entry from the first database is enabled if the timestamp associated with the event log entry stored in the first database is different from the timestamp in the event record stored in the second database.

Clause 15. The system of any one of clauses 11-13, wherein fetching the event log entry from the first database is enabled if the event log entry is not closed by the prescribed target time.

Clause 16. The system of any one of clauses 11-15, wherein determining the CEI comprises applying a priority factor to the polarity score, wherein the priority factor is determined based on a priority indicator assigned to the event log entry by the client.

Clause 17. The system of any one of clauses 11-16, wherein determining the CEI comprises reducing the polarity score if the event log entry remains open after passing the prescribed target time for a predefined duration.

Clause 18. The system of any one of clauses 11-17, wherein determining the CEI comprises reducing the polarity score if the event log entry remains open at the prescribed target time and a number of communications sent to the client corresponding to the event log entry is less than a predefined value.

Clause 19. The system of any one of clauses 11-18, wherein extracting the communication message comprises searching the event descriptor based on one or more predefined tags.

Clause 20. One or more computer-readable media having encoded thereon computer-executable instructions causing one or more processors to perform a method comprising: fetching an event log entry from a first database comprising a plurality of event log entries generated by a client, wherein the event log entry comprises a timestamp, an event descriptor, and a prescribed target time to close the event log entry; extracting a communication message sent by the client from the event descriptor; determining a polarity score based on sentiment analysis of the communication message; determining a client experience index (CEI) based on the polarity score; saving the CEI in an event record in a second database, wherein the event record corresponds to the event log entry and further comprises the timestamp and the prescribed target time to close the event log entry; determining an aggregated CEI based on an average of a plurality of CEIs determined for the corresponding plurality of event log entries; and outputting the aggregated CEI; wherein fetching the event log entry from the first database is enabled if the timestamp of the event log entry stored in the first database being is different from the timestamp in the event record stored in the second database or if the event log entry is not closed by the prescribed target time; and wherein determining the CEI comprises reducing the polarity score if the event log entry remains open after passing the prescribed target time for a predefined duration of if the event log entry remains open at the prescribed target time and a number of communications sent to the client corresponding to the event log entry is less than a predefined value.

Example 17—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
fetching an event log entry from a first database comprising a plurality of event log entries generated by a client, wherein the event log entry is associated with a timestamp, an event descriptor, and a prescribed target time to close the event log entry;
extracting a communication message sent by the client from the event descriptor;
determining a polarity score based on sentiment analysis of the communication message;
determining a client experience index based on the polarity score;
saving the client experience index in an event record in a second database, wherein the event record corresponds to the event log entry and further comprises the timestamp and the prescribed target time to close the event log entry;
determining an aggregated client experience index based on an average of a plurality of client experience indexes determined for the corresponding plurality of event log entries;
outputting the aggregated client experience index;
disabling the fetching responsive to a determination that the timestamp associated with the event log entry stored in the first database is the same as the timestamp in the event record stored in the second database and the event log entry is closed by the prescribed target time; and
enabling the fetching responsive to a determination that the timestamp associated with the event log entry stored in the first database is different from the timestamp in the event record stored in the second database or the event log entry is not closed by the prescribed target time.

2. The method of claim 1, wherein extracting the communication message comprises searching the event descriptor based on one or more predefined tags.

3. The method of claim 1, wherein fetching the event log entry from the first database is triggered by a request from a user.

4. The method of claim 1, wherein fetching the event log entry from the first database is performed according to a predefined timetable.

5. The method of claim 1, wherein determining the client experience index comprises applying a priority factor to the polarity score, wherein the priority factor is determined based on a priority indicator assigned to the event log entry by the client.

6. The method of claim 1, wherein determining the client experience index comprises reducing the polarity score if the event log entry remains open after passing the prescribed target time for a predefined duration.

7. The method of claim 1, wherein determining the client experience index comprises reducing the polarity score if the event log entry remains open at the prescribed target time and a number of communications sent to the client corresponding to the event log entry is less than a predefined value.

8. The method of claim 1, wherein determining the aggregated client experience index comprises applying one or more weightages to the average of the plurality of client experience indexes, wherein the one or more weightages are predefined based on one or more attributes of the corresponding plurality of event log entries.

9. A computing system comprising:
memory;
one or more hardware processors coupled to the memory; and
one or more computer readable storage media storing instructions that, when loaded into the memory, cause the one or more hardware processors to perform operations comprising:
fetching an event log entry from a first database comprising a plurality of event log entries generated by a client, wherein the event log entry is associated with a timestamp, an event descriptor, and a prescribed target time to close the event log entry;
extracting a communication message sent by the client from the event descriptor;
determining a polarity score based on sentiment analysis of the communication message;
determining a client experience index based on the polarity score;

saving the client experience index in an event record in a second database, wherein the event record corresponds to the event log entry and further comprises the timestamp and the prescribed target time to close the event log entry;

determining an aggregated client experience index based on an average of a plurality of client experience indexes determined for the corresponding plurality of event log entries;

outputting the aggregated client experience index;

disabling the fetching responsive to a determination that the timestamp associated with the event log entry stored in the first database is the same as the timestamp in the event record stored in the second database and the event log entry is closed by the prescribed target time; and enabling the fetching responsive to a determination that the timestamp associated with the event log entry stored in the first database is different from the timestamp in the event record stored in the second database or the event log entry is not closed by the prescribed target time.

10. The system of claim 9, wherein fetching the event log entry from the first database is triggered by a request from a user.

11. The system of claim 9, wherein fetching the event log entry from the first database is performed according to a predefined timetable.

12. The system of claim 9, wherein determining the client experience index comprises applying a priority factor to the polarity score, wherein the priority factor is determined based on a priority indicator assigned to the event log entry by the client.

13. The system of claim 9, wherein determining the client experience index comprises reducing the polarity score if the event log entry remains open after passing the prescribed target time for a predefined duration.

14. The system of claim 9, wherein determining the client experience index comprises reducing the polarity score if the event log entry remains open at the prescribed target time and a number of communications sent to the client corresponding to the event log entry is less than a predefined value.

15. The system of claim 9, wherein extracting the communication message comprises searching the event descriptor based on one or more predefined tags.

16. One or more non-transitory computer-readable media having encoded thereon computer-executable instructions causing one or more processors to perform a method comprising:

fetching an event log entry from a first database comprising a plurality of event log entries generated by a client, wherein the event log entry comprises a timestamp, an event descriptor, and a prescribed target time to close the event log entry;

extracting a communication message sent by the client from the event descriptor;

determining a polarity score based on sentiment analysis of the communication message;

determining a client experience index based on the polarity score;

saving the client experience index in an event record in a second database, wherein the event record corresponds to the event log entry and further comprises the timestamp and the prescribed target time to close the event log entry;

determining an aggregated client experience index based on an average of a plurality of client experience indexes determined for the corresponding plurality of event log entries;

outputting the aggregated client experience index;

disabling the fetching responsive to a determination that the timestamp associated with the event log entry stored in the first database is the same as the timestamp in the event record stored in the second database and the event log entry is closed by the prescribed target time; and enabling the fetching responsive to a determination that the timestamp associated with the event log entry stored in the first database is different from the timestamp in the event record stored in the second database or the event log entry is not closed by the prescribed target time, wherein determining the client experience index comprises reducing the polarity score if the event log entry remains open after passing the prescribed target time for a predefined duration or if the event log entry remains open at the prescribed target time and a number of communications sent to the client corresponding to the event log entry is less than a predefined value.

* * * * *